Nov. 18, 1924.

1,516,279

R. HELLMANN

FEED CONDUIT

Filed April 29, 1924

INVENTOR
Richard Hellmann
BY
his ATTORNEY

Patented Nov. 18, 1924.

1,516,279

UNITED STATES PATENT OFFICE.

RICHARD HELLMANN, OF LONG ISLAND CITY, NEW YORK.

FEED CONDUIT.

Application filed April 29, 1924. Serial No. 709,815.

*To all whom it may concern:*

Be it known that I, RICHARD HELLMANN, a citizen of the United States, and a resident of Long Island City, county of Queens, and State of New York, have invented certain new and useful Improvements in Feed Conduits, of which the following is a specification.

This invention relates to an improved conduit or feed hopper and more particularly to a feed hopper for plastic material such as mayonnaise dressing and the like, the invention having for its primary object to provide a conduit or hopper construction whereby the possibility of escape of the material between the hopper and the main feed pipe or conduit is precluded, while at the same time entrance of dust or dirt to the interior of the hopper is effectively obviated.

In one embodiment of the invention I propose to employ two conduit sections, the main section having removable side plates whereby access thereto can be readily had. The other conduit section is interposed between this main section and the end of the feed pipe or conduit and the principal novel feature of my present improvements resides in the provision of simple and effective means for easily and quickly adjusting this second conduit section so as to maintain a tight connection between the opposite ends thereof and the main feed conduit and the main conduit section, respectively.

With the above and other objects in view, the invention consists in the improved feed conduit and in the form, construction and relative arrangement of the several parts as will be hereinafter more fully described, illustrated in the accompanying drawings and subsequently incorporated in the subjoined claims.

In the drawing wherein I have shown one simple and practical embodiment of the invention and in which similar reference characters designate corresponding parts throughout the several views.

Figure 1:
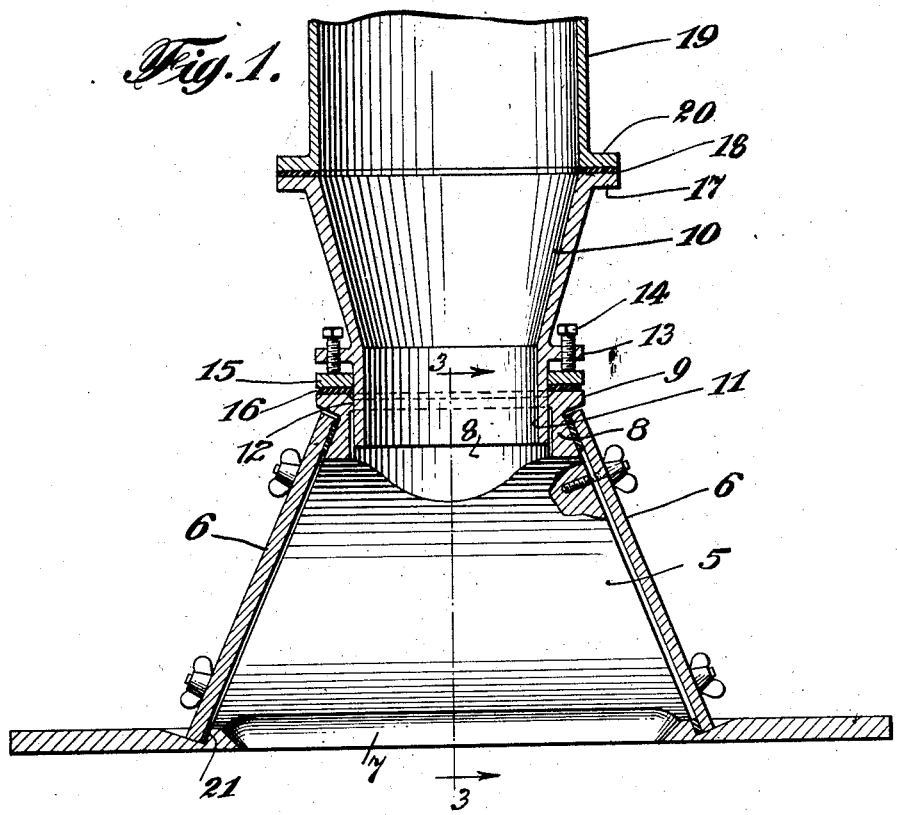
Figure 1 is a vertical sectional view illustrating a preferred form of my present improvements.
Figure 2:
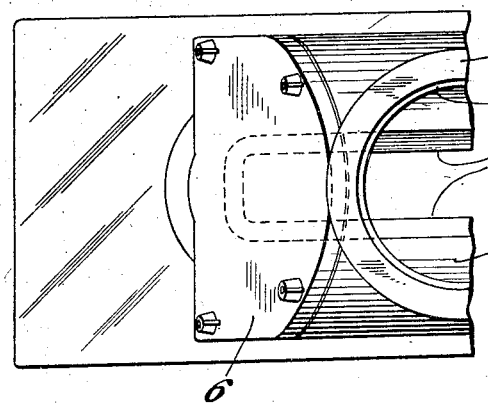
Figure 2 is a fragmentary plan view.
Figure 3:
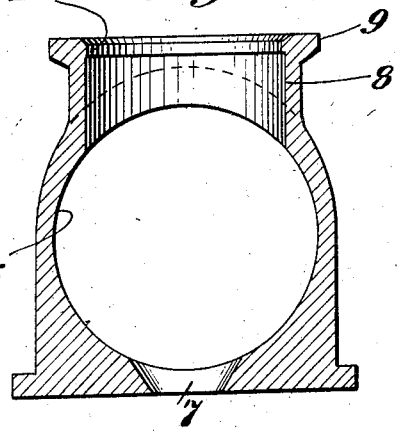
Figure 3 is a detail section through the main hopper taken on the line 3—3 of Figure 1.

Referring in detail to the drawing, 5 generally designates the main conduit or hopper having vertically sloping or inclined sides so that said conduit is of a general tapering form. The interior of this main conduit provides a circular chamber with the longer axis thereof extending between the inclined sides, upon which the ends of the said chamber open. These chamber ends are closed by means of the detachable side plates 6. The base of this conduit at the center of the circular chamber, is provided with a longitudinally extending slot 7 through which the material finally falls by gravity. The upper end of the conduit 5 has a reduced neck 8 provided with the outwardly extending annular flange 9 thereon.

An adjustable conduit section 10 has a body portion of flaring or tapering form at the smaller end of which a cylindrical extension 11 of uniform diameter is provided to extend downwardly into the neck 8 of the main conduit, said extension engaging upon an internal annular rib 12 formed on the wall of said neck. At the upper end of the cylindrical extension 11, the adjustable conduit 10 is provided with an annular flange 13 which carries a plurality of adjustable screws 14 threaded therein. The lower ends of these screws have bearing engagement upon a washer plate 15 and between this plate and the flange 9 on the neck 8 of the main conduit, a packing gasket 16 is interposed. The upper end of the adjustable conduit 10 is likewise provided with a flange 17 and a gasket 18 is inserted between this flange and the flange 20 formed on the lower end of the fixed or stationary feed pipe or conduit 19. Packing gaskets 21 are also interposed between the removable side plates 6 of the main conduit 5 and the body wall of said conduit at the open sides of the conduit chamber.

It will be readily understood from the above description that after the conduit section 10 has been properly assembled between the fixed feed pipe or conduit 19 and the main conduit 5, by turning the several screws 14, said conduit section may be forced upwardly, thereby forcing the washer plate 15 downwardly and tightly compressing the gasket 16, whereby an air and fluid-tight closure is produced between the wall of the extension 11 on said conduit section and the wall of the neck 8 on the main conduit. Also as the conduit section 10 is forced upwardly, the packing gasket 18 is tightly compressed between the flanges 17 and 20, thus effectually preventing any leakage of the material at this point. In this manner it will be seen that by periodically adjusting the screws 14, a perfectly air and fluid-tight connection between the main feed pipe or conduit and the conduit can be at all times maintained. At the same time, the conduit section 10 can be very easily and quickly removed from its applied position when it becomes necessary to clean the several parts. Thus perfectly sanitary conditions may be assured.

One of the important advantages incident to the construction of the main conduit section above described, is due to the fact that the cylindrical wall of the conduit chamber 5 provides a smooth and unbroken surface below the downward extension 11 on the upper conduit section over which the mayonnaise dressing or other plastic material may freely flow, thus avoiding the retardation of flow of the material and the formation of air pockets within the conduit chamber.

From the foregoing description taken in connection with the accompanying drawing, the construction and several advantages of my present invention will be clearly understood. While I have found the device to be very advantageous and satisfactory in connection with the feeding of mayonnaise dressing and like plastic food materials to jars or other containers, it will nevertheless be appreciated that the novel features of my present disclosure might also be utilized in connection with the feeding of various other materials. In such other adaptations of the invention it is possible that certain structural modifications in the several elements might be required. Accordingly, it is to be understood that I reserve the privilege of resorting to all such legitimate changes in the form, proportion and relative arrangement of the several parts as may be fairly embodied within the spirit and scope of the invention as claimed.

I claim:

1. A feed conduit comprising a main conduit section, a second conduit section interposed between the main section and a stationary feed conduit and having a part at its lower end extending downwardly into the main conduit section, and means for vertically adjusting said second conduit section to effect an air and fluid-tight connection between the same and said stationary feed conduit.

2. A main conduit section and a stationary feed conduit, a second conduit section interposed between the conduit and main section and having a part at its lower end extending downwardly into the main conduit section, packing means arranged upon the upper end of the main conduit section and around said downwardly extending part of the second conduit section, packing means interposed between the upper end of the second conduit section and the end of the fixed feed conduit, and means carried by said second conduit section for vertically adjusting the same and simultaneously compressing each of said packing means to thereby effect a fluid-tight joint between said second conduit section and the main conduit section and the feed conduit.

3. A main conduit section and a stationary feed conduit, a second conduit section interposed between the conduit and main section and having a part at its lower end extending downwardly into the main conduit section, packing means arranged upon the upper end of the main conduit section and around said downwardly extending part of the second conduit section, packing means interposed between the upper end of the second conduit section and the end of the fixed feed conduit, said second conduit section having an annular flange, and a plurality of adjustable screws mounted in said flange to compress the packing on the upper end of said main conduit section and simultaneously urge said second conduit section upwardly to compress the packing between the upper end thereof and the feed conduit.

4. A feed conduit comprising a main conduit section tapering upwardly from its base and having a cylindrical chamber extending horizontally thereof and opening upon opposite sides of the conduit, closure plates for the open ends of said chamber, said conduit section being provided at its upper end with a reduced neck, a second conduit section superposed upon the main section and having a cylindrical extension projecting downwardly through said neck of the main conduit section, and means for effecting an air tight connection between said second conduit section and the main conduit section and a stationary feed conduit.

5. The combination of two spaced conduits with an interposed conduit, the latter telescoping with one conduit and abutting the other, gaskets between the spaced conduits and the interposed conduit, and means for moving the interposed conduit to simultaneously expand the gaskets.

In testimony that I claim the foregoing as my invention, I have signed my name hereto.

RICHARD HELLMANN.